United States Patent [19]

Wells

[11] Patent Number: 4,467,598

[45] Date of Patent: Aug. 28, 1984

[54] ENERGY ABSORBING TRAILER CHAIN

[76] Inventor: William M. Wells, 104 Greenbriar La., Oak Ridge, Tenn. 37830

[21] Appl. No.: 258,389

[22] Filed: Apr. 28, 1981

[51] Int. Cl.³ .............................................. F16G 13/00
[52] U.S. Cl. .................................... 59/78; 59/84; 59/95; 403/2; 280/457; 188/371
[58] Field of Search .................... 59/84, 79, 79 R, 95, 59/35, 78, 90, 28; 280/457; 188/371, 373; 403/2

[56] References Cited

U.S. PATENT DOCUMENTS

| | | | |
|---|---|---|---|
| 515,023 | 2/1894 | Salathé59 | 95/ |
| 1,074,632 | 10/1913 | Lashar | 59/83 |
| 2,238,883 | 4/1941 | Hegelheimer | 59/78 |
| 3,265,407 | 8/1966 | Paddock | 280/457 |

OTHER PUBLICATIONS

C. H. A. McCaully, "The Chain Tester's Handbook", 6/19/56, pp. 5, 6, 7, 8 and 9.

Primary Examiner—Daniel C. Crane
Assistant Examiner—David B. Jones
Attorney, Agent, or Firm—Pitts, Ruderman & Kesterson

[57] ABSTRACT

An energy absorbing chain which can be used as a "one shot" safety chain to absorb sudden impacts or short term tensional forces is disclosed. According to the invention, the safety chain is made of a metal having high ductility such that the chain will tend to deform, stretch, and/or deflect rather than break. According to a preferred embodiment, the chain may include links such as links (36), (38), (40) and (42) each of which includes a twist of 90° to increase the amount of available deformation. In the preferred embodiment, link (36) and (40) include a twist in a first direction such as a clockwise direction whereas links (38) and (42) which alternate with links (36) and (40) include a 90° twist in the opposite or counterclockwise direction. Thus upon receiving or being subjected to such tensional forces, the links can deform as shown by links (58), (60) and (62) as they absorb energy for a short period of time. The energy absorbing chain of this invention is particularly suitable for use as a safety chain for attaching towed and towing vehicles together. Thus, a safety chain such as chain (94) is attached between a towing vehicle (86) and a towed vehicle (90) such that if the coupling becomes disengaged the safety chain (94) will provide an opportunity for the two vehicles to be brought under control as they move down a roadway.

13 Claims, 8 Drawing Figures

ENERGY ABSORBING TRAILER CHAIN

DESCRIPTION

TECHNICAL FIELD

This invention relates generally to energy absorbing devices and more particularly to energy absorbing chains which can be used in emergency systems, such as, for example, the safety chain system between a towed and towing vehicle. In particular, unlike most chains, the chain of this system is not in any way treated to make the steel stronger, since such treatment generally results in decreased ductility and energy absorption capability. In fact, it is most desirable that the energy absorbing chain of this invention should have high ductility and the ability to deform. Deforming of the chain makes the system suitable for only one emergency use, but provides increased energy absorption capabilities, and allows the use of smaller diameter chain links. In a preferred embodiment, the chain of this invention uses links which have twists, such twists would be at an angle which would be determined precisely by an optimization test program, but are expected to be typified as 90° therein to provide additional deforming capabilities and consequently greater energy absorbing capabilities.

BACKGROUND ART

It is well recognized that chains have been used as securing devices for centuries. The flexibility of the chain and the inability of primitive society to draw long lines or steel cables resulted in the use of chains in most every field. In addition, although most chains were comprised of simple oval or round links, chains having unusually shaped links have also been developed for decoration and other purposes. However, since the primary purpose of the chain was to provide a strong securing device, various methods of treating the steel have been used to provide stronger chains which are less subject to breaking. Such methods are, for example, heat treating of steel having medium to high carbon content, and plastic deformation of low carbon steel at room temperature (cold work). Such treatment almost invariably results in reduced ductility and energy absorption capability. For example, "The Chain Tester's Handbook" by C. H. A. McCaully of Great Britain, and published for the Chain Testers' Association of Great Britain by Rollprint Limited, London, at page 9 includes a table showing the percentage of elongation of various types of steel having different carbon content. As can be seen, dead soft steel having 0.08% carbon has the highest elongation which is 40%.

Other chains include, as an example, chains having twisted links which are commonly used on vehicle tires for providing traction. By use of the twisted link a more regular cross-section is presented between the vehicle tire and the roadway. In the past, although substantially all chains may at times be required to absorb some energy, the goal was generally to increase the strength of the chain. That is, increase its ability to withstand forces (tons, pounds, kilograms, etc.) by making the chain so strong it would not break or deform. Little effort, however, has been made to maximize the energy (foot-pounds, joules, etc.) absorption ability of a chain.

The need for providing some sort of shock or impact (energy) absorption or giving resilience to a chain system has in the past been accomplished by the attachment of resilient members such as hydraulic cylinders, springs, and the like. Other techniques such as the continuous bands disclosed in U.S. Pat. No. 403,147 issued to Schinneller and Jones on May 14, 1889 discloses the use of metal bands having resilience. These bands are used to couple cars such as railroad cars. In addition, U.S. Pat. No. 3,775,969 issued to P. F. Vasterling on Dec. 4, 1973 discloses common chain which has an elastomeric material covering the links and substantially filling the clearance spaces between the links. Thus, assuming that the chain is covered by the elastomeric material while in a contracted condition, the elastomeric material will fill the clearance spaces and thus when the chain is subjected to tension, the elastomeric material between the clearance spaces is compressed such that it must absorb energy as the chain is stretched. Thus, the chain of P. F. Vasterling is an example of a chain system having energy absorbing characteristics. In addition, trailers using chains as safety systems have been combined with springs to provide some energy absorbing capabilities to such combination systems. However, other than such combination sytems, chains having elastomeric material, and resilient bands, chains in the past have been simply built strong enough to assure that tension forces applied thereto cannot exceed the tensile strength of the chain so that the chain retains its original shape without any deformation. Such chains typically are made out of very hard materials such as steel or carbon steel, and are brittle. Therefore, unfortunately, when such high-strength chains fail, they usually do so abruptly. In addition, because of the high strength of the chain itself, the attaching fixtures must also be very strong, since such attaching fixtures should be at least as strong as the chain.

Therefore, it is an object of this invention to provide an energy absorbing chain which allows the use of smaller diameter lower strength links.

It is yet another object of the present invention to provide an energy absorbing chain which is suitable for use in safety systems.

It is still another object of this invention to provide an inexpensive energy absorbing chain which does not require strengthening treatments.

In the past, it has been common to use a chain arrangement with a towed and towing vehicle as a safety device to keep the vehicles together in the event the primary hitch or coupling connecting the two vehicles became disengaged. An example, of such a safety device is disclosed in U.S. Pat. No. 3,123,383 issued to W. J. Humpal on Mar. 3, 1964. The patent to Humpal discloses a standard type safety chain which includes a keyhole link which fits over the ball hitch of a trailer system and in turn attaches to the towed vehicle and the towing vehicle. However, as can be seen, the chain disclosed in this patent uses standard oval shaped links. Similarly, the safety chain system disclosed in the U.S. Pat. No. 3,265,407, issued to C. I. Paddock on Aug. 9, 1966, discloses another safety system which will continue to support the tongue of the towed vehicle such that it doesn't contact the road surface even upon the disengagement of the hitch from the towing vehicle. Again, however, the chain used in this particular safety system uses oval standard shaped links. In addition, the trailer safety chain systems disclosed in the SAE (Society of Automotive Engineers) Handbook, Section 36, covering trailers, trailer coupling hitches and safety chains for automobiles clearly discloses standards for hitches and safety chains recommended by that engineering body. According to paragraph 6.1 of the SAE Standards, a safety chain is defined "as any connection (including chain or its equivalent in strength and the attaching means) from the front of the trailer or trailer tongue to the rear of the towing vehicle for the purposes of retaining connection between the towing and towed vehicle in the event of failure of the trailer coupling or ball". The Standard further goes on to describe specifications of chains which may be used as trailer safety chains. In particular, the specification requires welded steel chain links or their equivalent, wherein the effect of the standard is that each link of a safety chain shall be equal to or greater in minimum break test load than the gross weight of the trailer including its load. Thus, it is seen that to date, safety chain installations have been based upon the concept of a minimum strength test. That is, chains which can withstand great forces, without regard for the energy absorbing capabilities of the chains. Unfortunately, the typical sequence of actions which occur when a towed vehicle becomes unhitched from its towing vehicle can result in greater forces than the weight of the trailer and its content upon the chain. A typical sequence is that when the towed vehicle becomes disconnected from its normal hitch, the driver of the towing vehicle will become aware of the problem perhaps when he sees the towed vehicle moving somewhat uncontrolled at the rear of his towing vehicle. Such uncontrolled movement usually means that the towed vehicle is now being pulled or towed by the safety chains and not the trailer hitch. The driver's usual reaction is to immediately apply the brakes to try to bring the two vehicles under control. However, in many instances, the driver will apply his brakes so hard that the towed vehicle which has no braking system will accelerate rapidly with respect to the speed of the towing vehicle. Thus, it will move forward with its tongue under the vehicle. The increased forces resulting from the towed vehicle's inertia will often snap the safety chain leaving the towed vehicle free to encounter traffic or roadside obstacles. It can be shown with simple calculations using the principles of mechanics that although the safety chain may have had the strength equal to the loaded weight of the towed vehicle, it may be called on to handle even greater forces in an emergency situation when the towing vehicle applies its brakes. To solve this problem, it is more logical that safety chains for such trailer systems be selected such that the safety chain can absorb the kinetic energy due to the inertial forces applied during such a panic situation.

Therefore, it is another object of this invention to provide a trailer safety system having a safety chain which has energy absorption capabilities substantially greater than safety chains of comparable size which are presently available.

DISCLOSURE OF THE INVENTION

Other objects and advantages will in part be obvious, and will in part appear hereinafter, and will be accomplished by the present invention which provides energy absorbing chains having a plurality of interconnecting links. Each of the interconnecting links comprises a twisted closed loop and is made of a metal having a selected ductility such that when the chain is subjected to tensional forces, the link will absorb energy resulting from the tensional forces as the links deform, untwist and elongate in excess of that possible due to the ductility of the metal alone. In a particular preferred embodiment, the multiplicity of interconnecting links include a first set of links having a twist in a first direction and a second set of links having a twist in the opposite direction. Thus, in this particular embodiment, the untwisting and deforming of the link in a first direction as it absorbs energy is compensated by the untwisting and deforming of a link in the second direction. Consequently, there is no resistance against twisting as would occur in a chain where all of the links have a twist in the same direction. The energy absorbing chain is particularly suitable for use in connecting a towing vehicle with a towed vehicle wherein a first coupling member is securely mounted to the towing vehicle and a second coupling member is securely mounted to the towed vehicle such that the towing vehicle will move the towed vehicle along a roadway. The energy absorbing chain is detachably connected between the towing vehicle and the towed vehicle. In the event the second coupling and first coupling become unconnected while the towing vehicle and towed vehicle are moving along a roadway, at least a portion of any inertial energy resulting from impact or sudden tensional forces applied to the energy absorbing chain will be absorbed by the safety chain deforming and untwisting thereby allowing the vehicle to be brought to a stop in a controlled manner.

BRIEF DESCRIPTION OF THE DRAWINGS

The above-mentioned features of the present invention will be more clearly understood from the consideration of the following descriptions in connection with the accompanying drawings in which.

BEST MODE FOR CARRYING OUT THE INVENTION

Figure 1:
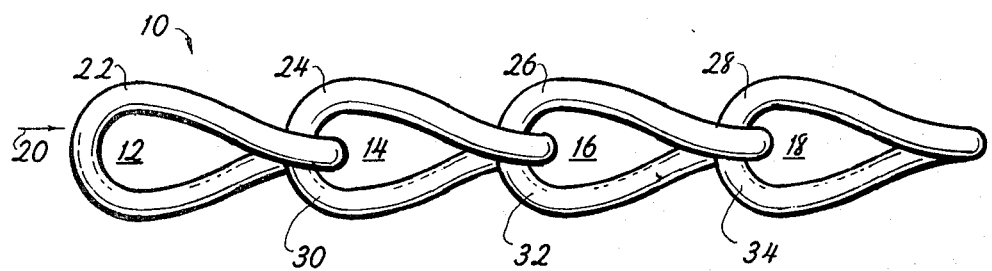
FIG. 1 is a pictorial view of an energy absorbing chain of this invention wherein each link has a twist in the same direction.

Chains used as safety devices, must of course, be selected to withstand forces which they might reasonably be expected to encounter without breaking. However, unlike "working chain" which may be continuously subjected to tensional forces, some types of safety chains will serve their primary purpose if they function without breaking or fracturing only one time. That is, they serve as an emergency safety device by withstanding sudden impact or tensional forces for a short period of time. It will be understood that since a standard or working chain's primary purpose is to transmit forces through the many links, the basic consideration of such a working chain is its strength. That is, how much force (pounds, tons, kilograms, etc.) the chain can withstand is of utmost importance. Safety or emergency chains which must withstand tensional forces for an extruded period of time (for example, minutes or hours) are also selected for their strength in the same manner as a working chain. Therefore, to increase the strength of standard chains, the links may be made out of a special alloy steel or treated by tempering, (eg medium or high carbon steel), cold rolling, etc. as necessary. However, chains which are so treated or made of special alloys usually have very low ductility. Therefore, even though they resist breaking and may be exceptionally strong, they will likely have very little energy absorbing capabilities. On the other hand, emergency or safety chains which will typically experience one time impacts are, according to this invention, preferably selected as to their energy absorbing capabilities (ie. foot-pounds, joules, etc.) rather than their strength. To this end, it has been found that, emergency chains which experience impacts or sudden forces and which are made from ductile metals such as low carbon steel are preferable to chains made from case hardened, brittle metals since they can absorb more energy. This is because energy is dissipated as work and work units, of course include a distance parameter (feet, meters, etc.) along with the force parameter (pounds, tons, kilograms, etc.). Thus, the more deflection or deformation a chain link can withstand without fracture, the more energy it can absorb. Tests have indicated that the standard readily available commercial chain typically will not elongate more than 20% to 23% of its total length before failing, whereas the energy absoring chain of this invention will clearly elongate in excess of 23%. For example, energy absorbing chains of this invention tested to date (which did not fail at a weld) elongated between 50% and 68% before failing. Of course, as was discussed heretofore in the Background Art portion of this application, for low carbon, or dead soft steel, only 40% elongation is due to the ductility of the metal, and thus the remaining elongation is from the untwisting of the links. Further, the use of chains with greater energy absorption characteristics allows the selection of smaller elements by which the chain is attached, and also reduces the chance of a weld failure. Also of importance is the fact that the high ductility, low strength, steel is usually available at a lower cost. To increase the strength of a chain made from low carbon steel (typically the lowest cost steel available), the chain may be cold worked. That is, the rod stock steel is (for example) drawn through dies at room temperature before bending and welding. According to the features of the present invention, such cold working would not even be desirable much less necessary. However, chains fabricated by using a cold working process can be annealed to increase their ductility and energy absorbing capabilities. Therefore, low carbon steel or any other metal with high ductility can be used to advantage in the present invention. From the above, it should now be appreciated that increased energy absorption is of greater importance than chain strength for certain types of safety chains. Further, whereas in prior art chains, the deforming of the chain could be considered as a chain failure, the safety chain of the present invention is specifically made to deform when forces greater than a selected magnitude or applied thereto. In such a manner, the deforming of the chain absorbs energy for a period of time allowing an unsafe condition to be brought under control. Thus, as was discussed hereinabove, it will be appreciated that a side benefit of the present invention is that low carbon, inexpensive, soft iron or steel may be used in the fabrication of such chains rather than tempered or high carbon steel. Of particular importance is the fact that low carbon steel with high ductility can on a "one-shot" basis absorb more energy than high strength steel with the same cross-sectional size of a link of the chain.

To maximize the energy absorption according to the present invention, the chain links have a twist or bend which allows for additional deformation and consequenty additional energy absorption. Testing by the inventor has shown that a twisted chain can absorb on the order of 30-40% more energy than an otherwise identical untwisted chain. Therefore, by increasing the deflection or deformation of a chain before a link fractures, the energy absorption capability of the chain can be improved. Consequently, features of the present invention include chain links fabricated with a twist or bend which untwist under high tensional forces to provide increased deformation and a corresponding increase in the energy absorption capability.

Referring now to FIG. 1, there is shown a pictorial view of a four-link length of a twisted chain wherein each of the four links have a twist in the same direction. As shown, the length of the chain shown generally at 10 includes four links 12, 14, 16, and 18 each of which includes a clockwise twist when viewed in the direction of arrow 20. The clockwise twist is shown as about 90° (if it is considered that the near end 22 is stationary and that the twist is accomplished by rotating the far end in the clockwise direction). As can be clearly seen, since the twist of all four links is in the same direction, link 12 extends from a topmost portion 22 down and across the front of portion 24 of link 14, around the back of portion 24 of link 14 and back to connect with the topmost portion 22. Thus, as was explained before, link 12 has a 90° clockwise twist when viewed in the direction shown by arrow 20. In a similar manner, for each of the remaining links, 14, 16 and 18, it is seen that the topmost portions 24, 26 and 28 extend down and across the leftmost portions 32 and 34 of links 16 and 18, respectively. Although chains somewhat similar in appearance to those shown in FIG. 1 are used as the cross chain of chain systems used on automobiles between the tires and roadway for inclement weather and as pulley chains in hoist window pulleys and the like, it will be appreciated that such chains are not specifically selected to have ductility such that the chain has increased energy absorbing capabilities.

Figure 2:
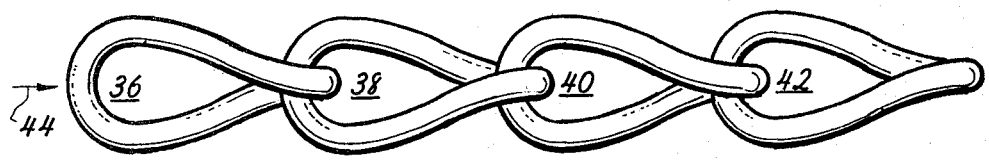
FIG. 2 is a pictorial view of an energy absorbing chain of this invention wherein alternate links are twisted in opposite directions.

Referring now to FIG. 2, there is shown a preferred embodiment of the present invention wherein the direction of twist alternates with each link. As shown, the length of chain includes four links 36, 38, 40 and 42, each of which has a twist opposite that of its two adjacent links when viewed in the direction shown by arrow 44. That is, for example, link 36 when viewed in the direction shown by arrow 44 has a clockwise twist whereas link 38 has a counter clockwise twist. Similarly, link 40 has a clockwise twist while link 42 has a counter clockwise twist.

Figure 3:
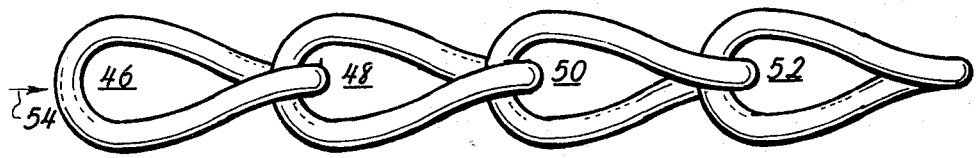
FIG. 3 shows an alternate embodiment of a length of energy absorbing chain of this invention wherein two adjoining links have a twist in a first direction, and then two other adjoining links have a twist in the opposite direction.

FIG. 3 shows still another alternate embodiment of the energy absorbing chain of this invention. As shown in FIG. 3, the four links 46, 48, 50 and 52 each include 90° twists. However, the first two links 46 and 48 when viewed in the direction shown by arrow 54 have counter clockwise twists, whereas links 50 and 52 when viewed in the direction shown by arrow 54 have clockwise twists. As will be discussed in more detail hereinafter it is not important whether the individual links of chains have counter clockwise or clockwise twists so long as the number of links having clockwise twists is substantially the same as the number of links having counter clockwise twists.

Thus, as has been discussed hereinabove links of a chain making up a length of chain of this invention preferably comprise a first group of links which have a twist in a first direction and a second group of links having a twist in the second direction. The advantages of providing two groups of links having opposite twists, is that if all of the links are twisted in the same direction, a swivel must necessarily be placed in the length of chain or at one of its connection points to allow untwisting of the chain as it deflects or deforms. For example, if all of the links are fabricated with a 90° twist in the same direction, then if four links of the chain are to untwist, a swivel or some other means must be included to allow the chains to rotate in a full turn of 360°. To overcome this problem, preferred embodiments of this invention as shown in FIGS. 2 and 3 include a first group of links having a twist in counter clockwise directions, and a second group of links having a twist in a clockwise direction such that the untwisting and deforming of a link in the first group will be compensated by untwisting and deforming of a link in the second group. So long as the number of links of each group in a length of chain is kept substantially the same, restriction to the rotation of the chain as it deforms and untwists can be avoided.

Figure 4:
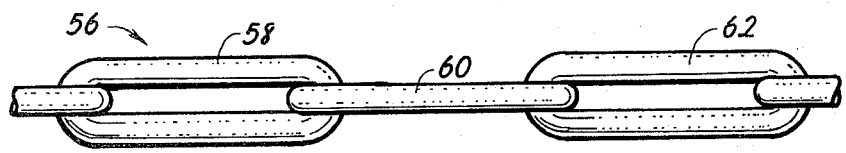
FIG. 4 shows the energy absorbing chain of this invention of FIGS. 1, 2 or 3 wherein tensional forces have been applied to the chains to the extent that the chains have deformed and untwisted as they absorbed energy.

Referring now to FIG. 4, there is shown a length of chain 56 which includes links 58, 60 and 62. As can be clearly seen, the links of this chain have a different appearance than the links of chain discussed with respect to FIGS. 1, 2 and 3. However, the links 58, 60 and 62 of FIG. 4 are to show the appearance of a length of chain incorporating the features of this invention and which has experienced deflection or deformation of its links. For example, it will be appreciated that links 58, 60 and 62 could represent a deformed version of links 36, 38 and 40 of FIGS. 2, or 12, 14 and 16 of FIG. 1 or links 48, 50 and 52 of FIG. 3. It is important to note that the chain has changed its shape and has deformed significantly under tensional forces as it absorbed energy.

Therefore, there has been discussed hereinabove a chain which is specifically designed to have energy absorbing characteristics. Thus, as was discussed, such chains have particular application in a situation where the chain may experience sudden impact forces or short term tensional forces. Further, the application of such a chain is typically useful as a safety chain where the chain will not be called on to perform its safety function more than one time, but will, in fact, have done its job if it withstands the impact or tensional forces only one time.

An application particularly benefited by the features of this invention is the safety chain arrangements used to connect a towed vehicle with a towing vehicle. It will be appreciated, of course, that automobiles, trucks, etc. commonly tow other vehicles such as trailers, boats, other automobiles, etc. To accomplish such towing, there is usually provided a primary hitch arrangement by which the towing vehicle can be connected and disconnected from the towed vehicle. Also typically included are safety chains which are provided so as to allow the vehicle to be brought under control in the event the primary coupling becomes disengaged.

Figure 5:
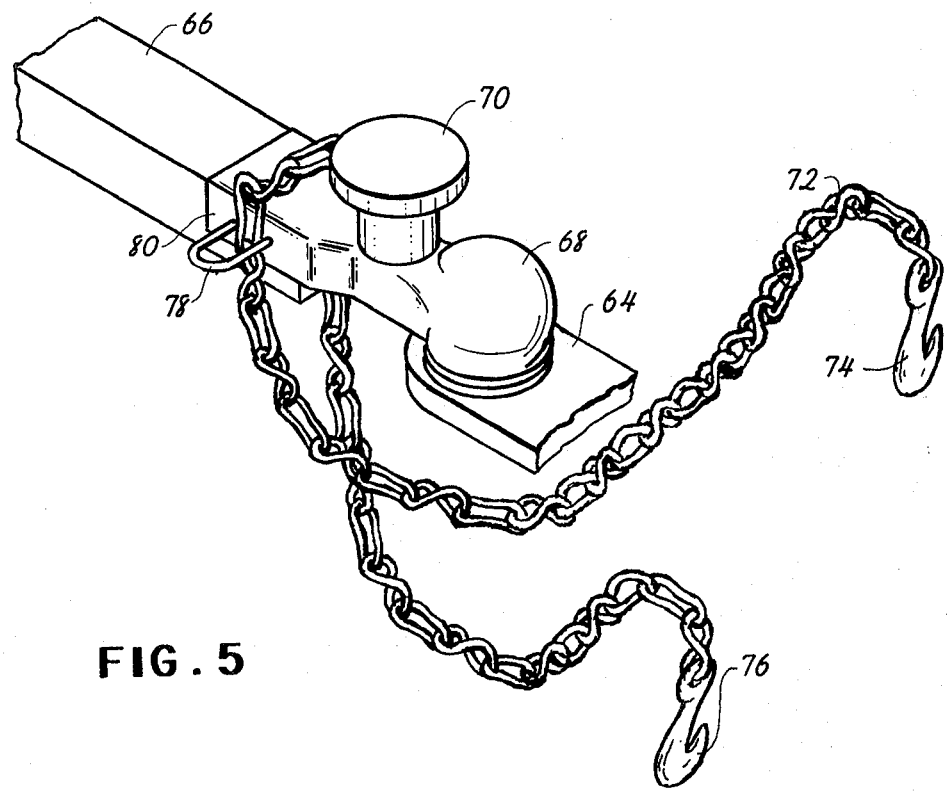
FIGS. 5 and 6 show two embodiments of energy absorbing chains of this invention for use as a safety chain on a trailer hitch for a towed and towing vehicle.
Figure 6:
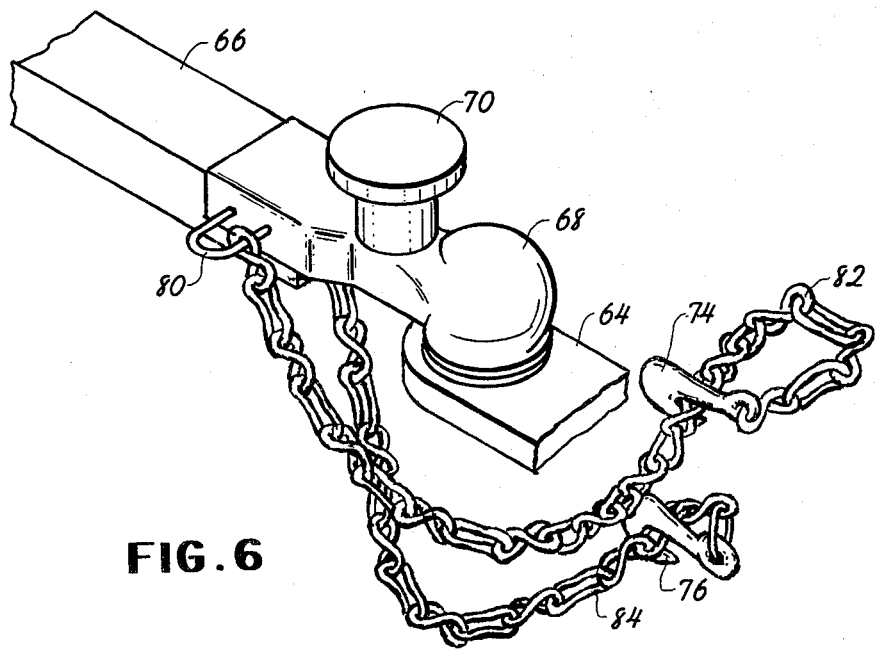
Figure 7:
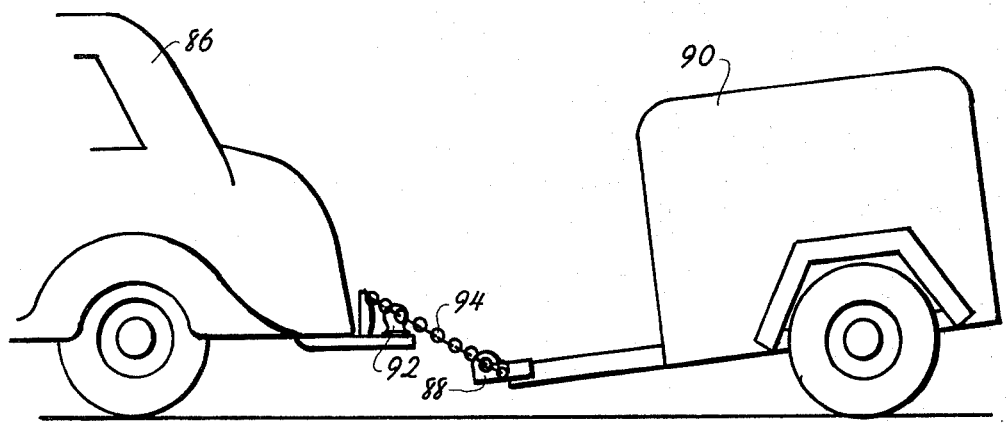
FIGS. 7 and 8 show pictorial views of a typical emergency sequence when a towed vehicle becomes unhitched from the normal coupling with its towed vehicle, lags behind the towing vehicle to the length of the safety chain and then upon braking by the towing vehicle proceeds forward putting excessive tensional forces upon the safety chain.
Figure 8:
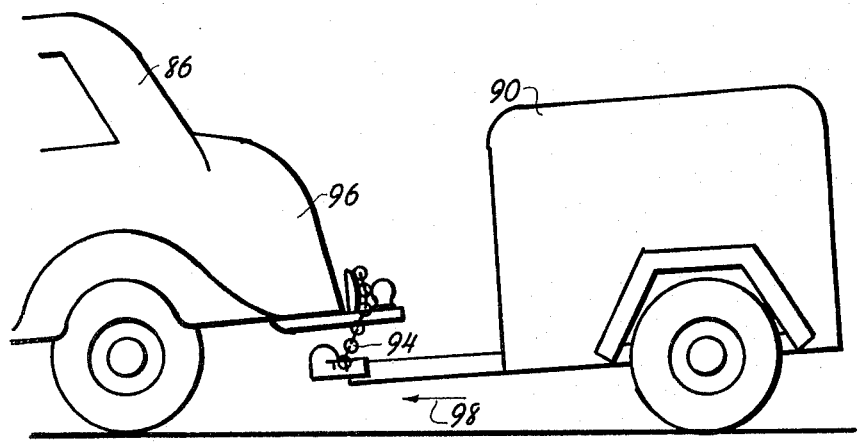

Referring now to FIGS. 5 and 6 there are shown two typical trailer coupling arrangements which use safety chains. In FIGS. 5 and 6, identical elements will include the same reference numbers for both figures. As shown, there is typically provided a ball hitch 64 which is securely and/or permanently mounted to the towing vehicle (not shown). Also provided is a towing bar 66 having a receptacle 68 to receive the ball of hitch 64. Also as shown, an adjusting and clamping knob 70 is used to clamp the receptacle 78 around the ball of hitch 64. In the embodiment of FIG. 5, there is shown a single energy absorbing safety chain 72 of the present invention, having twisted links, which includes two hooks 74 and 76. Energy absorbing safety chain 72 is mounted to the tow bar 66 of the towed vehicle by means of links or loops such as loop 78 shown as being welded to the back portion 80 of the hitch attached to tow bar 66. As shown, this is an unconnected length of chain which can be removed from the towing bar 66. The two ends of the chain which include hooks 74 and 76 are then attached to the frame or other solid members of the towing vehicle by means of hooks 74 and 76 such that the chain hangs loosely without binding. Likewise, the arrangement in FIG. 6 also includes an energy absorbing chain. However, rather than a single length of chain, the arrangement of FIG. 6 includes two separate chains 82 and 84 which are each mounted to a loop such as loop 80. In addition, rather than the hooks 74 and 76 being hooked to the towing vehicle they may be hooked around a member of the towing vehicle and then hooked to their respective chains as shown in FIG. 6. It will be appreciated, of course, that either of the arrangements shown in FIG. 5 or 6 (as other arrangements) are suitable for attaching a safety chain between a towed vehicle and a towing vehicle. Furthermore, any other commonly known arrangement for attaching safety chains between a towed vehicle and a towing vehicle would also be suitable for using energy absorbing chains of this invention. Referring now to FIGS. 7 and 8, there are illustrated the typical sequence of events that occurs in an emergency situation when a towed vehicle and a towing vehicle uncouple as they move down a roadway. As a vehicle is moving down a roadway, the safety chains are typically loose and the entire weight of the towed vehicle on the towing vehicle is transmitted by means of the primary coupling device. However, because of carelessness or failure of the main coupling device, etc., the main coupling device may separate such that the towing vehicle and the towed vehicle are connected only by means of the safety chain. For example, referring now to FIGS. 7 and 8, a typical emergency sequence will be described. As the driver of the automobile 86 moves down the roadway, the coupling 88 attached to trailer 90 comes loose from the coupling ball 92 mounted to vehicle 86. FIG. 7 therefore shows the typical arrangement and condition of the towing vehicle 86 and the towed vehicle 90 as the two vehicles are joined only by safety chain 94. When this condition occurs, the driver of vehicle 86 usually becomes aware that something is wrong in that his own vehicle is not reacting in a normal manner, or he notices in the rear-view mirror that trailer 90 seems to be detached or may be swinging as it moves down the roadway. When the driver of vehicle 86 makes such a determination, his usual immediate reaction is to apply the brakes of his vehicle 86 so that he can quickly bring the situation under control. Referring now to FIG. 8, there is shown the following event which typically occurs upon the driver of vehicle 86 applying his brakes. As shown, vehicle 86 with the application of brakes usually takes on a nose low attitude which results in rear end 96 of the car or vehicle being raised. At the same time, the vehicle is rapidly slowing down and since there are frequently no brakes on trailer 90, trailer 90 continues to move forward and therefore accelerates with respect to vehicle 86 in the direction shown by arrow 98. Since chain 94 was slack prior to the two vehicles becoming uncoupled, this slack or excessive chain length will allow trailer 90 to move from the extreme separation point shown in FIG. 7 to the position shown in FIG. 8, and because of the rapid decrease in speed of vehicle 86 kinetic energy due to the inertia of trailer 90 generated by the two different speeds of vehicle 86 and trailer 90 must also be stopped by chain 94 as shown in FIG. 8. Because of the difference in the negative acceleration between vehicle 86 and trailer 90 a significant force will be imparted to chain 94 which may greatly exceed the forces encountered by normal towing. Thus, chain 94 must not only be able to carry the load which was previously carried by the coupling 92 and 88 of the towed and towing vehicle, but it must now carry that towing load plus such tensional forces created by the inertia of towed vehicle 90 until the two vehicles can be brought under control.

Consequently, in the past chains such as chain 94 when used as safety chains, were selected only to be strong enough to handle the weight of the towed vehicle. However, it will be appreciated that if chain 94 can absorb the energy resulting from the inertia of trailer 90 only one time, the safety chain will have accomplished its primary function. Therefore, it will be appreciated that by the use of the ductile twisted chain of the present invention, a safety chain for use between a towed and towing vehicle may be selected which will provide greater safety, less cost, and smaller diameter chain links.

Thus, although the present invention has been described with respect to specific embodiments for providing an energy absorbing safety chain, it is not intended that such specific references be considered limitations upon the scope of this invention except insofar as is set forth in the following claims.

I claim:

1. A safety chain system having energy absorbing characteristics for use with a towing vehicle and a towed vehicle combination having a releasable coupling suitable for moving said towed vehicle along a roadway with said towing vehicle, said safety chain system comprising:
a length of safety chain detachably connectable between such towing vehicle and such towed vehicle, said length of safety chain comprising a plurality of serially inter-connected links, each link being a closed loop having a first end and a further end and being provided with a rotational twist from said first end to said further end, said links being fabricated of an unhardened low carbon steel characterized by sufficient ductility such that when sufficient tensional forces are applied through said safety chain, said links permanently deform by untwisting and elongating as said safety chain system absorbs the energy, and said plurality of interconnected links including a first group of links having said rotational twist in a first selected direction and a second group of links having a twist in a second direction which is opposite said first selected direction such that untwisting of a link in said first group is compensated by untwisting of a link in said second group, the total elongation of said links of said safety chain system comprising elongation due to untwisting of said links in addition to the elongation possible due to said ductility of said unhardened low carbon steel.

2. The safety system of claim 1 wherein said links of said first and second groups are in an alternating relationship.

3. The safety chain system of claim 1 wherein links in said first group are substantially equal in number to links in said second group.

4. The safety system of claim 1 wherein said links elongate in excess of 50%.

5. The safety chain system of claim 4 wherein said elongation of said links is between 50% and 68%.

6. The safety chain system of claim 1 wherein said total elongation of said links is in excess of the possible 40% elongation due to the ductility of said metal.

7. A length of safety chain having increased energy absorbing characteristics to withstand tensional forces applied therethrough, said length of safety chain comprising:
a plurality of serially inter-connected links, each link being a closed loop having a first end and a further end and being provided with a rotational twist from said first end to said further end, said links being fabricated of an unhardened low carbon steel characterized by sufficient ductility such that when sufficient tensional forces are applied through said safety chain said links permanently deform by untwisting said elongating as said safety chain absorbs the energy of said tensional forces, and said plurality of interconnected links including a first group of links having said rotational twist in a first selected direction and a second group of links having a twist in a second direction which is opposite said first elected direction such that untwisting of a link in said first group is compensated by untwisting of a link in said second group, said total elongation of said links of said safety chain comprising elongation due to untwisting of said links in addition to the elongation possible due to said ductility of said unhardened low carbon steel.

8. The chain structure of claim 7 further comprising a first connector element at a first end of said chain and a further connector element at a further end of said chain, said first and further connector elements providing means for connecting said chain to objects for applying said axial tension.

9. The chain structure of claim 7 wherein said first portion of said links has substantially the same number of links as said second portion.

10. The chain structure of claim 9 wherein links of said first portion serially alternate in said chain with links of said second portion.

11. The chain structure of claim 7 wherein said rotational twist of each link is substantially equal and is substantially 90°.

12. The length of safety chain of claim 7 wherein said elongation is between 50% and 68%.

13. The length of safety chain of claim 7 wherein said total elongation of said links is in excess of the possible 40% elongation due to the ductility of said metal.

* * * * *